June 13, 1967 F. R. CARLOCK ETAL 3,325,803
DEFLECTION CONTROL CIRCUIT
Filed Oct. 1, 1964
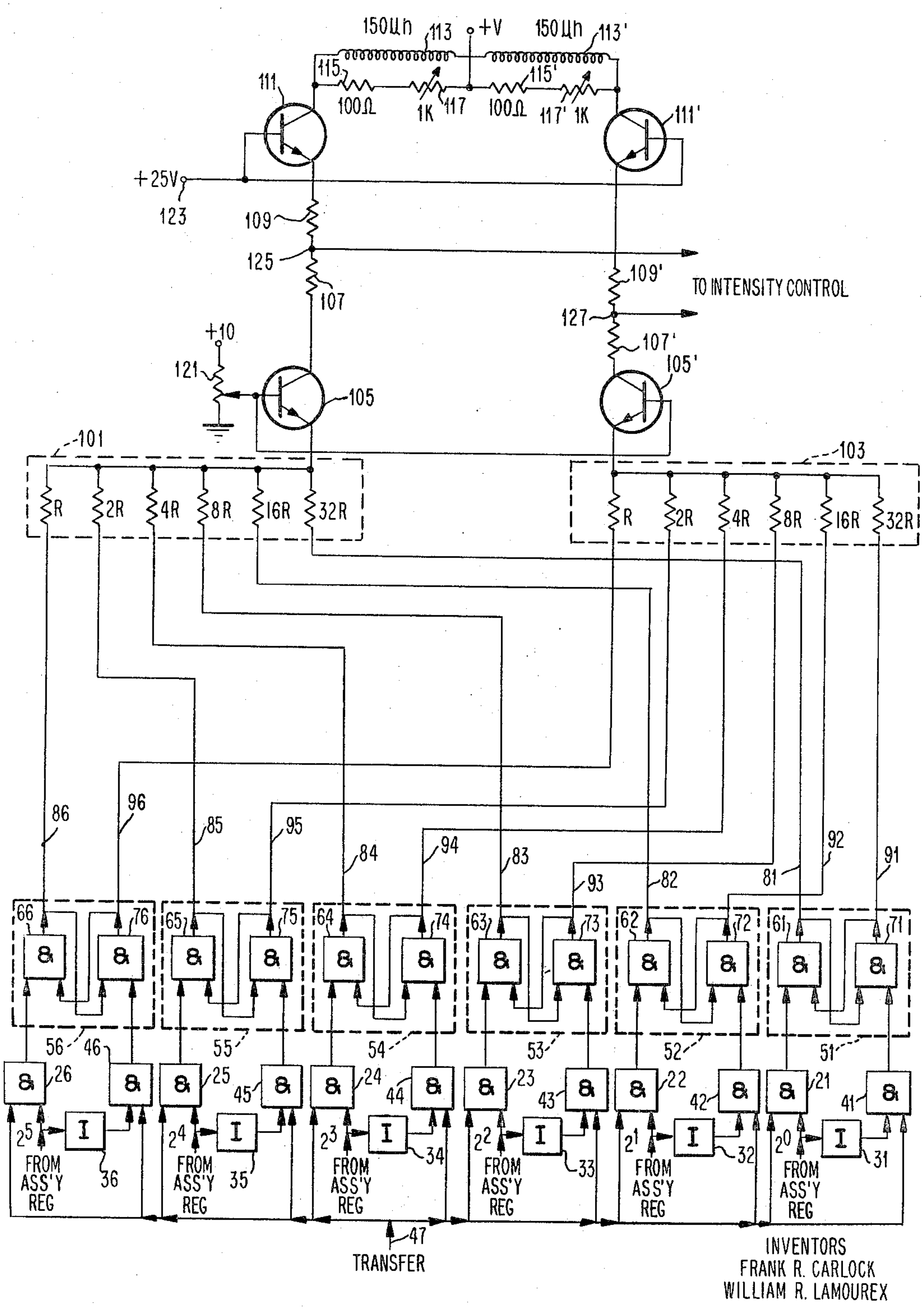
INVENTORS
FRANK R. CARLOCK
WILLIAM R. LAMOUREX
BY Joseph J. Connerton
ATTORNEY United States Patent Office 3,325,803

Patented June 13, 1967

3,325,803

DEFLECTION CONTROL CIRCUIT

Frank R. Carlock, Hyde Park, and William R. Lamoureux, Kingston, N.Y., assignors to International Business Machines Corporation, New York, N.Y., a corporation of New York Filed Oct. 1, 1964, Ser. No. 400,848
7 Claims. (Cl. 340—324)

The present invention relates to a function generator and more particularly to a circuit for generating a signal suitable for deflection of a cathode ray beam.

In cathode ray tube vector or character generating systems, it is frequently desirable to deflect an electron beam in accordance with a predetermined scanning pattern. One example of such a requirement is found in cathode ray tube vector or character generation systems which operate in combination with a control device such as a data processing system to generate vectors or characters for display on the screen of a cathode ray tube. An example of such a system is shown generally in copending application Ser. No. 397,187, Ramp Generator, filed by Robert A. Thorpe, Sept. 17, 1964. In a CRT display system of the above designated type, it is desirable to specify the endpoint addresses of the vector to be generated in digital form and generate the appropriate deflection signals directly from the specified addresses.

One of the basic requirements of a cathode ray tube display system is that of generating a signal suitable for deflection of the CRT beam. Various types of circuit configurations have been employed in the prior art to generate a ramp function suitable for CRT deflection. The system described in the above identified copending application generates a ramp function in a CRT constant time circuit by generating an overdrive signal, a predetermined multiple of the deflection signal, which is applied to an integrator circuit for a predetermined time interval such that the charging pattern of the integrator provides a substantially linear ramp signal. However, generally speaking, such circuits are relatively complex, fairly expensive and require precise timing and control.

In accordance with the present invention, there is provided an analogue system for generating straight line vectors or strokes for use in a vector-character generation system in which characters are composed of a series of straight line strokes. Digital input signals designating the endpoint addresses of the vectors to be generated are applied through voltage buffer circuits to decoding networks which convert the signals into corresponding analogue waveforms which are applied to the magnetic yoke of a cathode ray tube. The system is operated in push-pull mode to permit generation of specified vectors in any direction. By operating the yoke in a critically damped mode and using a constant time for stroke generation, a straight line is provided for each particular stroke in the display irrespective of its length. A supplementary feature of the invention is the generation of a suitable intensity control signal to compensate for the variable velocity of the beam or length of the vector to provide substantially uniform intensity.

Accordingly, a primary object of the present invention is to provide an improved function generator.

Another object of the present invention is to provide a simplified magnetic deflection system.

A further object of the present invention is to provide an improved system for generating deflection and intensity control signals for a cathode ray tube display.

Still another object of the present invention is to provide an improved system utilizing a critically damped yoke for generating a CRT deflection signal.

A further object of the present invention is to provide a simplified analogue system for generating a deflection signal to cause a stroke to be written on the face of a cathode ray tube in response to a digital input signal.

The foregoing and other objects, features and advantages of the invention will be apparent from the following more particular description of a preferred embodiment of the invention, as illustrated in the accompanying drawings.

In the drawings:

FIGURE 1 illustrates in block schematic form a preferred embodiment of the subject invention.

In the following description, it will be assumed that the CRT beam will be suitably blanked and unblanked as in the above referenced copending application, since the beam control circuitry is considered beyond the scope of the instant invention and the specific details of the circuitry unnecessary for an understanding thereof. Likewise, it will be assumed that the beam will be positioned in the screen of the CRT in the desired position for generating a specific character through conventional means. The invention will be described with reference to a character generation system in which a character is generated as a series of straight line strokes, the endpoints of each stroke being identified by a six bit byte.

Throughout the following descriptions and in the accompanying drawing there are certain conventions employed which are familiar to certain of those skilled in the art. Additional information concerning these conventions is as follows:

In the logical or block diagrams of the drawing a conventional arrowhead is employed to indicate (1) a circuit connection, (2) energization with pulse signals and (3) the direction of pulse travel which is also the direction of control. When storage registers are employed, such register stages are assumed to include any necessary input and output gating circuitry. In the description, a general arrangement of a preferred embodiment of the invention will be described with respect to the manner in which the various circuit components and apparatus are interconnected as well as the general overall operation which is performed by these components and apparatus. Also, the manner in which the vectors, the endpoints of which are specified in digital form, are generated will be described. To clarify the description of the present invention, only the generation of the horizontal or X component will be described, although it will be understood that the vertical of Y component will be generated in identical manner and both component signals applied to their corresponding deflection points to generate a specified vector.

Referring now to the drawing the six bit digital byte comprising bits $2^0$ through $2^5$ is applied directly to an input register consisting of logical AND circuit 21–26 and 41–46. In the preferred embodiment hereindescribed, binary 1 and 0 signals are distinguished by 180° phase difference. Assuming the single inputs comprising data byte $2^0$–$2^5$ are representative of binary one, corresponding out-of-phase inputs representative of binary zero are generated by inverter circuits 31–36, the outputs of which are connected to a register comprising logical AND circuits 41–46 respectively. While the source of the digital input data is not deemed pertinent to an understanding of the present invention, the input data is shown as originating from an assembly register, i.e., a storage medium in which words are assembled from data bits or bytes and then transferred to an output device in the form of bytes, in the illustrated invention herein disclosed, six bit bytes.

Assuming that latch register circuits 51–56 have been cleared or reset prior to operation, in response to a transfer signal applied to line 47, logical AND circuits 21–26 and 41–46 are sampled and those logical AND circuits which are conditioned by the assembly register will generate an output. The latch register is comprised of stages 51–56 representing the $2^0$–$2^5$ stages respectively. Each stage is composed of two logical AND circuits interconnected as shown, the output from logical AND circuits 61–66 identifying the binary 1 state of register stages 51–56, and the output of logical AND circuits 71–76 identifying the binary 0 state of stages 51–56. A latch circuit is arbitrarily designated as SET when the significant output is provided by its associated logical AND circuits 61–66, and as RESET when the significant output is provided by its corresponding logical AND circuits 71–76 respectively. The outputs of logical AND circuits 21–26 are connected to the inputs of logical AND circuits 61–66 representing the binary one input of latch register circuits 51–56, while the outputs of logical AND circuits 41–46 are connected to the inputs of logical AND circuits 71–76 representing the binary 0 input of latch register stages 51–56 respectively. In the preferred embodiment herein described, logical AND circuits function as inverters under a true AND condition such that in response to two positive input signals, a negative output is provided; under any other input condition, a positive output is provided. With respect to the latch register circuits utilized in the present invention, these consist essentially of two interconnected positive AND circuits of the type above described, the output of the first logical circuit being connected to the input of the second and vice-versa. Since the preferred embodiment of the present invention operates on conventional push-pull theory, double ended logic is employed, i.e., either the binary 1 or binary 0 condition may have a significant output depending on the state of the input variable. When a latch register stage 51–56 is in the clear or reset condition, maximum current flow occurs from its associated logical AND circuits 61–66; when a latch register stage is in the set condition, current flows from the associated logical AND circuits 71–76.

After data byte $2^0$–$2^5$ has been stored in buffer register stages 21–26 and 41–46, a positive readout pulse is applied to line 47 labeled TRANSFER to sample each register stage 21–26 and 41–46. Those stages 21–26 containing binary 1 cause a negative output to be applied to logical AND circuits 61–66 of associated latch register stages 51–56, while those stages containing binary 0 cause a negative output to be applied from stages 41–46 to logical AND circuits 71–76. As previously described, a positive output is provided from the logical AND circuits for any condition other than two positive inputs. Since logical AND circuits 71–76 are connected to opposite outputs from the assembly register as logical AND circuits 61–66, a negative output is provided from logical AND circuits 71–76 whenever its associated logical AND 61–66 is in the binary 1 state and vice-versa. This negative signal together with the cross coupled signal from its associated latch component 71–76 causes a positive signal to be emitted on lines 81–86 from register stages 61–66 containing a binary one. This positive signal is applied as an input to its companion logical AND latch circuit, which in turn is conditioned by the positive input from its associated register stage 41–46 whereby a negative signal is provided on lines 91–96 from the latch register circuits 71–76 indicative of binary 0. For example, assume the input byte is 101010 such that a positive input is applied from the assembly register to logical AND circuits 26, 24 and 22. When line 47 is pulsed by the positive transfer signal, logical AND circuits 26, 24 and 22 have the second positive input applied and the resulting negative output signals are applied to logical AND circuit 66, 64 and 62, resulting in positive outputs on lines 86, 84 and 82 respectively. Correspondingly, these positive outputs, when applied as inputs to associated latch circuits 76, 74 and 72, cause negative outputs to be generated on lines 96, 94 and 92 respectively. As more fully described hereinafter, current flows in those circuits having negative outputs, and this current is binary weighted by the associated decoding network. Decoding network 101 is associated with the binary 1 output from the associated latch register 51–56; decoding network 103 is associated with the binary 0 output from the associated latch register stages. Repeating, the binary one state of a latch register is identified by a positive output from the left latch circuit (61–66) and a negative output from the companion circuit (71–76), while the binary zero is represented by the reverse condition. Due to the double ended decoding and the push-pull configuration of the deflection circuitry, current always flows from one output of each latch register stage in accordance with the binary state of that stage.

Each output from the latch register is connected to an associated leg of decoding network 101 or 103. Decoding networks 101 and 103 comprise conventional binary weighted networks in which binary weighted resistors provide a current proportional to the relative significance of each bit. For example, a minimum resistance value designated R is connected to the most significant output on line 86 providing maximum current, while the maximum resistance 32R is connected to the least significant output on line 81 providing minimum current. Decoding network 103 is connected in like manner to the zero output from the associated latch register circuits. In view of the balanced nature of the decoding networks, it is obvious that current will flow in one and only one leg of each binary bit in accordance with the state of the particular bit. In the preferred embodiment herein described and purely by way of definition, a binary 1 condition of a latch register stage will cause current to flow through the associated leg of decoding network 103; conversely, a binary 0 condition of a latch register stage will cause current to flow through the associated leg of decoding network 101. Decoding network 101 is directly coupled through switching transistor 105, resistor 107, 109 and transistor 111 to the left portion 113 of center-tapped magnetic yoke; the output from decoding network 103 is connected to the right half of the center-tapped yoke through identical circuitry which is identified by corresponding subscripts with a prime designation. Magnetic yoke 113, 113′ is critically damped by serially connected resistors 115, 115′ and rheostats 117, 117′ respectively. The bases of transistors 105, 105′ are conditioned by the output from potentiometer 121, while the bases of transistors 111, 111′ are conditioned by a source of positive potential at terminal 123. As is well known in the art, the deflection of a magnetic yoke is directly proportional to the current applied thereto. In a push-pull configuration, current can flow in either direction, an essential requirement since the nature of the vectors or strokes to be generated can be in either direction. Thus by convention or arbitrary definition, a positive horizontal vector component will be defined in a horizontal direction to the right, which will be identified by current through decoding network 103 and deflection yoke 113′; horizontal vector component will be defined as one extending in a horizontal direction to the left, which will be identified by current through decoding network 101 and yoke 113. Likewise, while not shown in the interest of clarity, Y deflection signals will be applied to the appropriate portion of the yoke in accordance with a predetermined designation. Conventionally, upward vertical movement is designated positive, downward movement is designated negative. During generation of each vector, the next byte from the assembly register is transferred to the buffer register 21–26, and the next stroke initiated by a transfer signal on line 47.

In known devices of the prior art, it was customary to apply the decoded representation of the digital input signal to an integrator circuit and to apply the resulting integrated waveform or a multiple thereof to the deflection yoke. However, in the present invention, by operating the CRT deflection yoke in a critically damped mode, a reasonably linear signal is attained and the circuitry employed in prior art devices to generate the overdrive as well as the integrating circuitry is obviated. It should be noted that a linear ramp signal is not required in order to generate a straight stroke on the CRT; the essential criteria is that the signals generated by the X and Y deflection occur in synchronism and be of substantially identical waveform. This is achieved in the instant invention by utilizing identical circuitry to generate the X and Y deflection voltages and utilizing a common load, i.e., the critically damped deflection yoke, to generate identical waveforms, and utilizing a common timing control in the form of transfer line 47.

In a constant time vector generator of the type employed in the instant invention, the same amount of time is required to generate a vector irrespective of the length of the vector. In such a system, the intensity of display would vary inversely with the velocity or length of the vector being generated. To provide uniform intensity control, the present invention utilizes an output from terminals 125, 127 in each current path, such that a voltage proportional to the current change applied to the yoke is generated across the resistors. This output signal is then differentiated, amplified, shaped through conventional means and applied to the control grid of the cathode ray tube whereby a substantially uniform intensity is provided irrespective of the velocity of the beam or length of the stroke being generated. In the instant invention, an auxiliary character yoke is employed to generate the strokes after the character positioning has been determined by the main deflection yoke, the size of the individual strokes is limited to a maximum of 56 raster units as compared to 4,096 raster units representing the maximum deflection of the main deflection unit.

To operate in the manner above described, high speed is essential. Accordingly, high speed circuitry is used throughout the illustrated embodiment, transistors 105 and 105' and 107 and 107' are very fast switching transistors and decoders 101 and 103 in combination with the latch register inputs exhibit rapid response. The desired wave shaping is achieved by the kickback of the yoke, which is simulated in the intensity control shaping circuitry. It is apparent from the foregoing that a relatively simplified system of achieving a precisely defined stroke generated on the face of the CRT has been achieved with a corresponding reduction in cost of the circuitry which has been eliminated. The use of output currents from a D/A converter to directly drive a yoke in a critically damped mode is advantageous from a cost standpoint compared to any known systems of the prior art. While the values required to critically damp a yoke would be well known to one skilled in the art, the specific values employed in the critical damping of the specific yoke are shown in detail in the drawing.

While the preferred embodiment has been shown as utilizing double ended decoding and push-pull operation, the invention is equally applicable to single ended decoding and yoke driving. Likewise a word size of greater or fewer than six bits could be employed to identify the strokes.

While the invention may be implemented in any compatible logic system, a preferred logical implementation is diffused diode transistor logic described and set forth in copending application Ser. No. 357,372, Data Processing System, filed by Gene Amdahl et al., Apr. 6, 1964 and assigned to the assignee of the present invention.

While the invention has been particularly shown and described with reference to preferred embodiment thereof, it will be understood by those skilled in the art that various changes in form and details may be made therein without departing from the spirit and scope of the invention.

What is claimed is:

1. A function generator for generating signals to control the deflection of a cathode ray tube comprising in combination
   - a data source,
   - said data source defining endpoint addresses of vectors to be generated on the screen of said cathode ray tube,
   - a decoder for generating analogue signal representations of said endpoint address signals,

- a cathode ray tube magnetic yoke connected in a critically damped mode, and
   - means for applying said analog signals from said decoder directly to said critically damped yoke, the resulting signals through said yoke causing said CRT beam to move between the positions specified by said endpoint addresses to define said vectors.

2. A function generator for generating signals to control the deflection of a cathode ray tube comprising in combination
   - a digital data source,
   - said digital data source defining in absolute form terminal endpoint addresses of vectors to be generated on the screen of said cathode ray tube,
   - a decoder for generating analogue signal representations of said endpoint address signals,
   - means connecting said digital data source to said decoder,
   - a cathode ray tube magnetic yoke connected in a critically damped mode, and
   - means for connecting said decoder to said critically damped yoke whereby said analogue signals are applied directly to said damped yoke, the resulting signals through said yoke causing said CRT beam to move between the positions specified by said endpoint addresses to define said vectors.

3. A system for generating signals for controlling the deflection of a cathode ray tube comprising in combination
   - a data source for supplying digital signals specifying the endpoint addresses of vectors to be generated on the screen of a cathode ray tube,
   - means for converting each of said digital data signals to analogue representations thereof,
   - a magnetic deflection yoke,
   - means for critically damping said deflection yoke, and
   - means for applying said analogue signals directly to said yoke, the characteristics of said damped yoke producing a signal suitable for deflecting said beam in a straight line between the points specified by said endpoint addresses.

4. A system for generating a plurality of signals for controlling the deflection of a cathode ray tube display comprising in combination
   - a binary digital data source,
   - a plurality of input registers,
   - means for applying signals from said digital data source identifying the horizontal and vertical components of the endpoint addresses of vectors to be generated on said cathode ray tube to said input registers,
   - said cathode ray tube display including intensity control means,
   - a deflection yoke connected in a critically damped configuration,
   - a plurality of decoders connected in a double ended mode for generating analogue signals corresponding to the value of said digital signals representative of said endpoint addresses,
   - said decoders being responsive to the binary one and zero representations of said endpoint address signals to generate corresponding current signals, and
   - means for applying said current signals directly to said magnetic yoke for generating appropriate deflection signals to cause the beam of said cathode ray tube to interconnect the positions identified by said endpoint address signals.

5. A device of the character claimed in claim 4 wherein said intensity control means is responsive to the analog signal output of said decoders to provide intensity control signals for maintaining uniform beam intensity irrespective of the length or velocity of the vector.

6. A device of the character claimed in claim 5 wherein said intenisty control means includes an impedance network connected between the output of said decoders and said deflection yoke.

7. A system for generating signals for controlling the deflection of a cathode ray tube comprising in combination
a data source for supplying digital signals specifying the endpoint addresses of vectors to be generated on the screen of a cathode ray tube,
means for converting each of said digital signals to analogue representations thereof,
a magnetic deflection yoke,
means for applying said analogue signals directly to said yoke connected in a critically damped mode, the characteristics of said deflection yoke producing a signal suitable for deflecting said beam in a substantially straight line between the points specified by said endpoint addresses, and
means associated with said analog signal applying means for producing intensity control signals proportional to the magnitude of the analog signals applied to the deflection yoke to maintain uniform beam intensity irrespective of the vector length or velocity.

References Cited

UNITED STATES PATENTS

| | | | |
|---|---|---|---|
| 3,090,041 | 5/1963 | Dell | 340—324.1 |
| 3,205,344 | 9/1965 | Taylor et al. | 340—324.1 X |
| 3,205,488 | 9/1965 | Lumpkin | 340—324.1 |

OTHER REFERENCES

Schlesinger, K., Magnetic Deflection of Kinescopes in Proceedings of the I.R.E., Waves and Electrons Section (pp. 813–821) 1947.

NEIL C. READ, *Primary Examiner.*

A. J. KASPER, *Assistant Examiner.*